US006682130B2

(12) United States Patent
Lustig et al.

(10) Patent No.: US 6,682,130 B2
(45) Date of Patent: Jan. 27, 2004

(54) SERVICE VEHICLE

(75) Inventors: James H. Lustig, Greensboro, NC (US); David W. Conrad, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 47 days.

(21) Appl. No.: 10/068,521

(22) Filed: Feb. 6, 2002

(65) Prior Publication Data

US 2003/0146648 A1 Aug. 7, 2003

(51) Int. Cl.⁷ .................................................. B60J 5/06
(52) U.S. Cl. .................. 296/190.11; 296/202; 296/147; 296/146.9; 296/146.12; 296/146.13
(58) Field of Search ........................... 296/190.11, 202, 296/146.1, 147, 146.9, 146.11, 146.12, 146.13

(56) References Cited

U.S. PATENT DOCUMENTS

| 679,822 A | * | 8/1901 | Bahrenburg |
|---|---|---|---|
| 1,146,805 A | * | 7/1915 | McAvoy |
| 1,855,406 A | * | 4/1932 | Marine |
| 2,178,908 A | | 11/1939 | Hudson |
| 3,004,303 A | | 10/1961 | Wilmer |
| 3,628,216 A | | 12/1971 | Savell |
| 3,670,358 A | | 6/1972 | Schwartz et al. |
| 3,848,293 A | | 11/1974 | Marchione et al. |
| 3,967,850 A | | 7/1976 | Whisler |
| 4,162,097 A | | 7/1979 | Scribner |
| 4,609,216 A | | 9/1986 | Baker et al. |
| 4,738,329 A | | 4/1988 | Gauer |
| 4,930,836 A | * | 6/1990 | Grinn .......................... 296/146 |
| 5,263,227 A | | 11/1993 | Hrbek et al. |
| 5,354,589 A | | 10/1994 | Wass |
| 5,655,798 A | | 8/1997 | Kaveney et al. |
| 5,761,768 A | | 6/1998 | Wolf et al. |
| 5,951,098 A | * | 9/1999 | Waldeck et al. ........ 296/190.11 |
| 5,992,918 A | * | 11/1999 | Gobart et al. ........... 296/147.13 |
| 6,065,185 A | | 5/2000 | Breed et al. |
| 6,068,327 A | * | 5/2000 | Junginger .............. 296/146.13 |
| 6,070,362 A | | 6/2000 | Strassel |
| 6,502,896 B1 | * | 1/2003 | Nakata et al. .......... 296/190.11 |
| 6,505,882 B1 | * | 1/2003 | Morbach et al. ....... 296/146.11 |

FOREIGN PATENT DOCUMENTS

| DE | 4227411 | * | 2/1994 | ............ 296/146.13 |
|---|---|---|---|---|
| JP | 6-262949 | * | 9/1994 | ............ 296/190.11 |

* cited by examiner

Primary Examiner—D. Glenn Dayoan
Assistant Examiner—H. Gutman
(74) Attorney, Agent, or Firm—Watts Hoffmann Co., L.P.A.

(57) ABSTRACT

An over the highway vehicle having a body defining an occupant space and an access opening to the space is provided. A passenger access door is pivotally connected to the body. The door has pivotally connected upper and lower sections and is pivotal relative to the body between a closed position and partial and full open positions allowing unobstructed passage into and out of the space. The lower section is pivotal relative to the upper section between an aligned condition for closing the opening and a condition wherein the panels are generally juxtaposed. A tether is interposed between the cab and the lower section for limiting pivotal movement of the door when the door is in its aligned condition to the partially open position and permitting movement of the door to the full open position when the door is in the juxtaposed condition.

13 Claims, 6 Drawing Sheets

SERVICE VEHICLE

TECHNICAL FIELD

This invention relates to service vehicles and more particularly to that class of vehicles in which repeated and frequent access to an occupants' space within the cab is facilitated by maintaining a cab door in an open position.

BACKGROUND OF THE INVENTION

With service vehicles such as refuse trucks, it is often desirable to facilitate relative ingress and egress of workers into and out of an occupants' space in a cab. As an example, a trash truck servicing a residential neighborhood will move from residence to residence as workers empty the contents of trash cans into a trash transporting body carried by the vehicle. When a trash vehicle is servicing such a neighborhood, workers will often board the vehicle to ride relatively short distances between pick-up locations.

In order to expedite such a refuse collecting operation, at least the passenger side door will be maintained in an open condition and often the driver's side door will also be maintained open.

A problem with maintaining such doors open is that the front wheel fender typically interferes with a door swinging to a full open position. Accordingly, articulated doors have been developed in which a lower section is pivotal about a generally horizontal hinge to bring the lower section into juxtaposed relationship with an upper section. Typically, such juxtaposed sections are then secured together in a full open position.

A problem that has manifested itself, is that if the lower section of the door is not pivoted upwardly into aligned relationship with the upper section before a door opening to a full open position is attempted, the door will collide with the wheel or its fender preventing achievement of a full open condition. Such collisions frequently cause damage to either or both of the colliding parts of the vehicle.

Accordingly, it would be desirable to provide a vehicle construction in which a door can be swung to its full open position when, but only when, the upper and lower sections are in the juxtaposed relationship.

SUMMARY OF THE INVENTION

With a vehicle constructed in accordance with the present invention, an articulated door is provided which has upper and lower sections pivotally connected for relative pivotal movement about a generally horizontal axis. The door sections have a vertically aligned condition for closing an access opening into a vehicle passenger compartment. The door sections are relatively pivotal to allow the lower section to be swung upwardly to place it in a juxtaposed relationship with the upper section to enable positioning the door in a full open position.

A novel tether is provided that extends between the vehicle cab and the lower door section. The tether is sized such that it prevents the door being swung to a full open position when the sections are in their vertically aligned condition. Rather the tether limits door opening when the sections are aligned to a partially opened position in which collision with the wheel or fender is avoided. The size of the tether and the location of its connections to the cab and lower door section are such that when the door sections are in their juxtaposed relationship, the door can be swung rearwardly to a full open position wherein it is latched to maintain the full open position and the juxtaposed relationship of the door sections. Latching is provided for maintaining the door in the juxtaposed relationship and in its full open position.

The tether is sized and located such that the door cannot reach the full open position unless the door sections are in their juxtaposed relationship. Moreover, if the latch for maintaining the door in its juxtaposed relationship is disconnected when the door is in its full open position, the lower section is prevented from moving to the aligned condition. Since the lower section cannot move to the aligned condition, damaging door impact with a fender or wheel is prevented.

Accordingly, the objects of the invention are to provide a method and apparatus of controlling opening of an articulated door while avoiding damage to the door or other vehicle parts.

DETAILED DESCRIPTION OF THE PREFERRED EMBODIMENT

Figure 1:
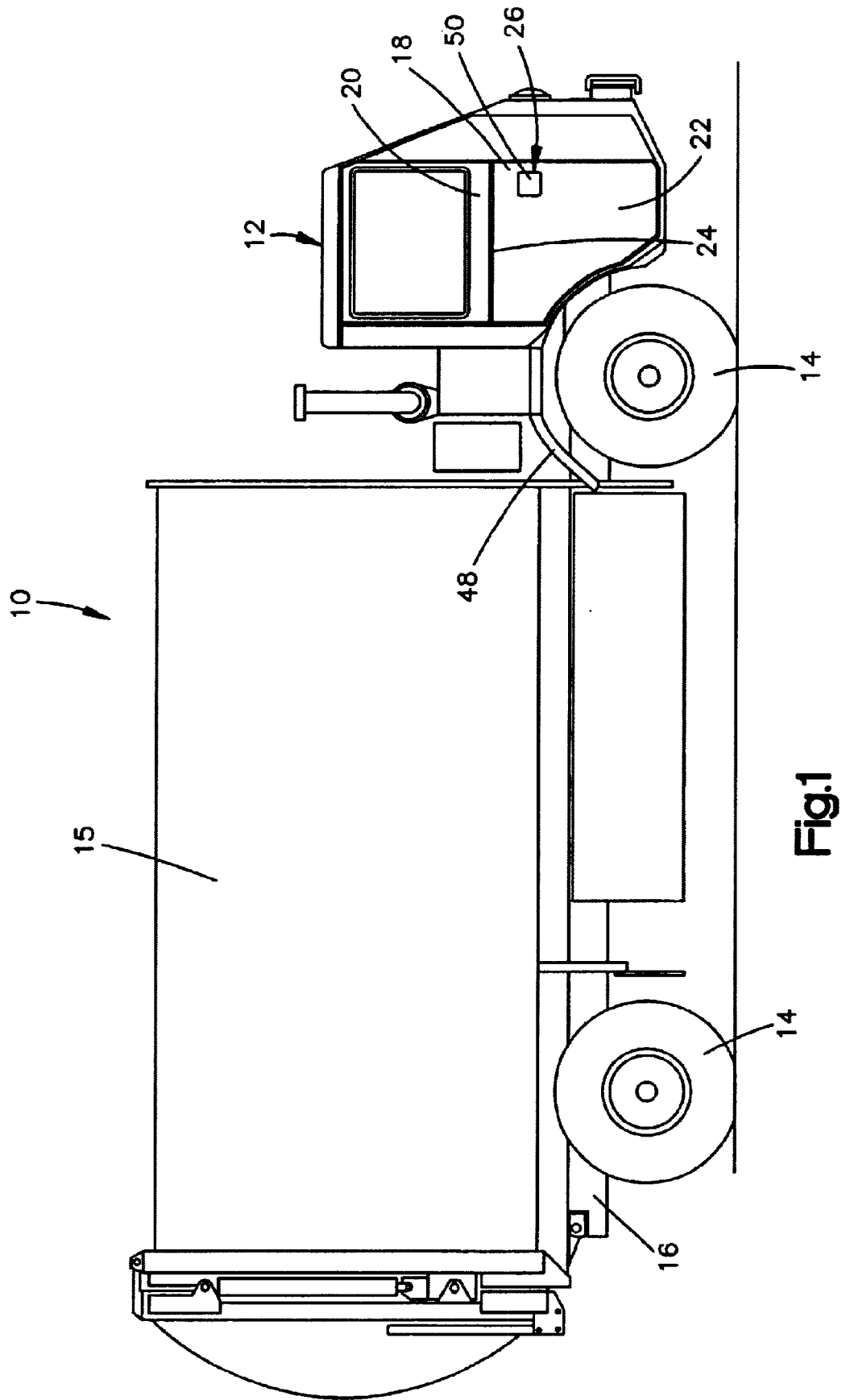
FIG. 1 is an elevational view of a refuse vehicle.

Referring to the drawings and to FIG. 1 in particular, a refuse vehicle is shown generally at 10. The vehicle includes a cab 12 and is supported by road wheels 14. A refuse container 15 is mounted behind the cab 12 on a vehicle frame 16.

The cab 12 includes a passenger access door 18. The door 18 has upper and lower sections 20,22 connected by a horizontal "piano" hinge 24. The door is moveable between a closed position of FIG. 1 and a partially open position as shown in phantom FIGS. 2 and 3. The lower section 22 is pivotal about the axis of the hinge 24 into juxtaposed relationship with the upper section 20 as shown in phantom FIG. 5 in phantom and in FIG. 7. A conventional latch 26 is provided to secure the door in its closed position of FIG. 1.

When the door is opened and the lower section 22 is pivoted about the axis of the hinge 24 into its juxtaposed relationship with the upper section 20, the latch 26 coacts with a second female latch section 28 carried by the upper door section 20 to secure the door sections in their juxtaposed positions.

Figure 7:
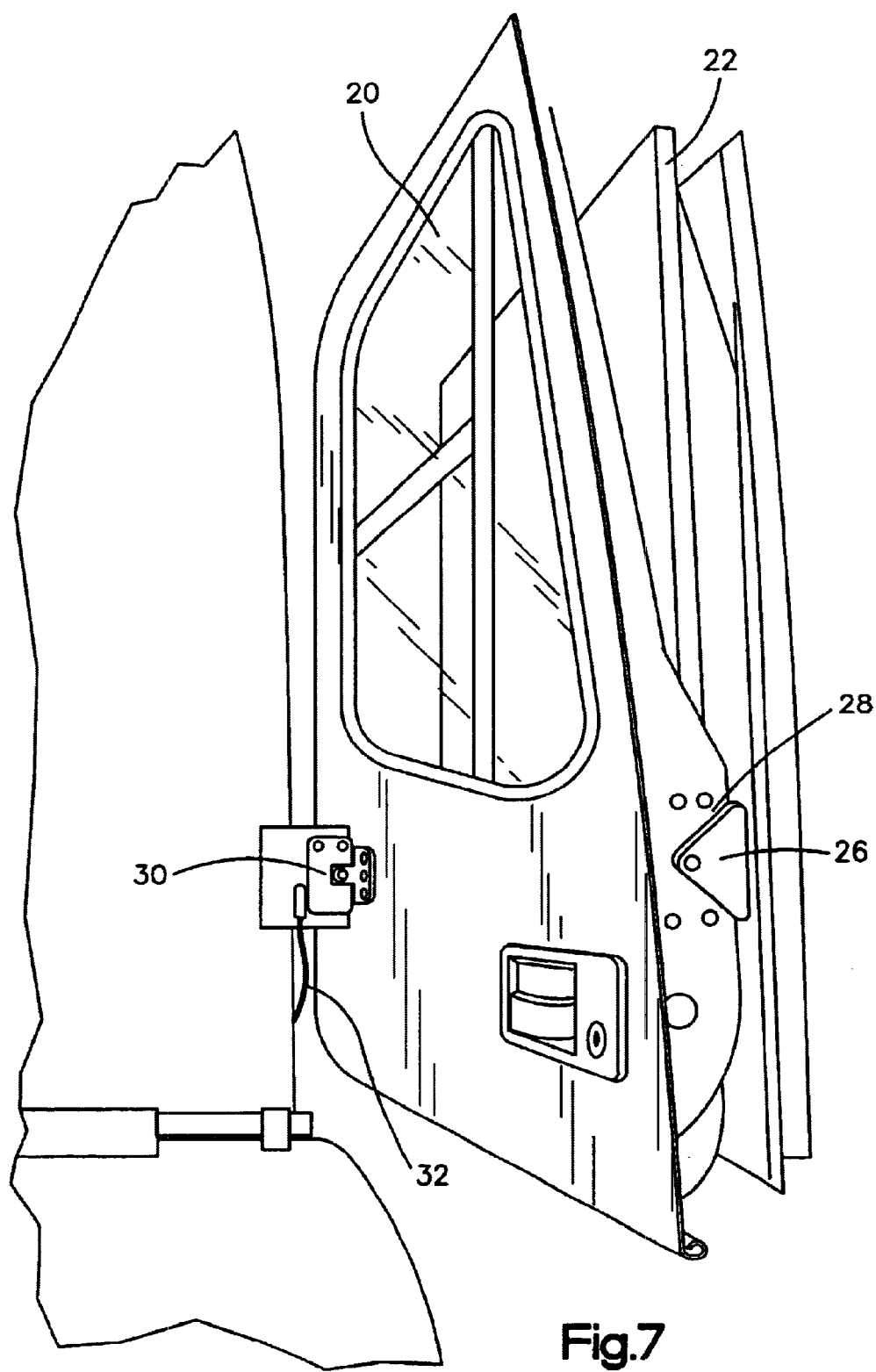
FIG. 7 is a view from the rear of the truck showing the door sections in their juxtaposed, full open and latched condition; and, FIG. 8 is an elevational view of the inside of the door in its aligned condition.

An open door latch 30 is provided to maintain the door in its full open position behind the passenger access opening to the cab 12, FIG. 7. A pull ring cable 32 is provided for release of the door open latch 30, when it is desired to bring the door from its full open and latched position to a closed position. At that time an operator simply unlatches the lower section 22 from the upper section by actuating the handle of the latch 26 to allow the door sections to return to an aligned position as shown in FIG. 1.

Figure 8:
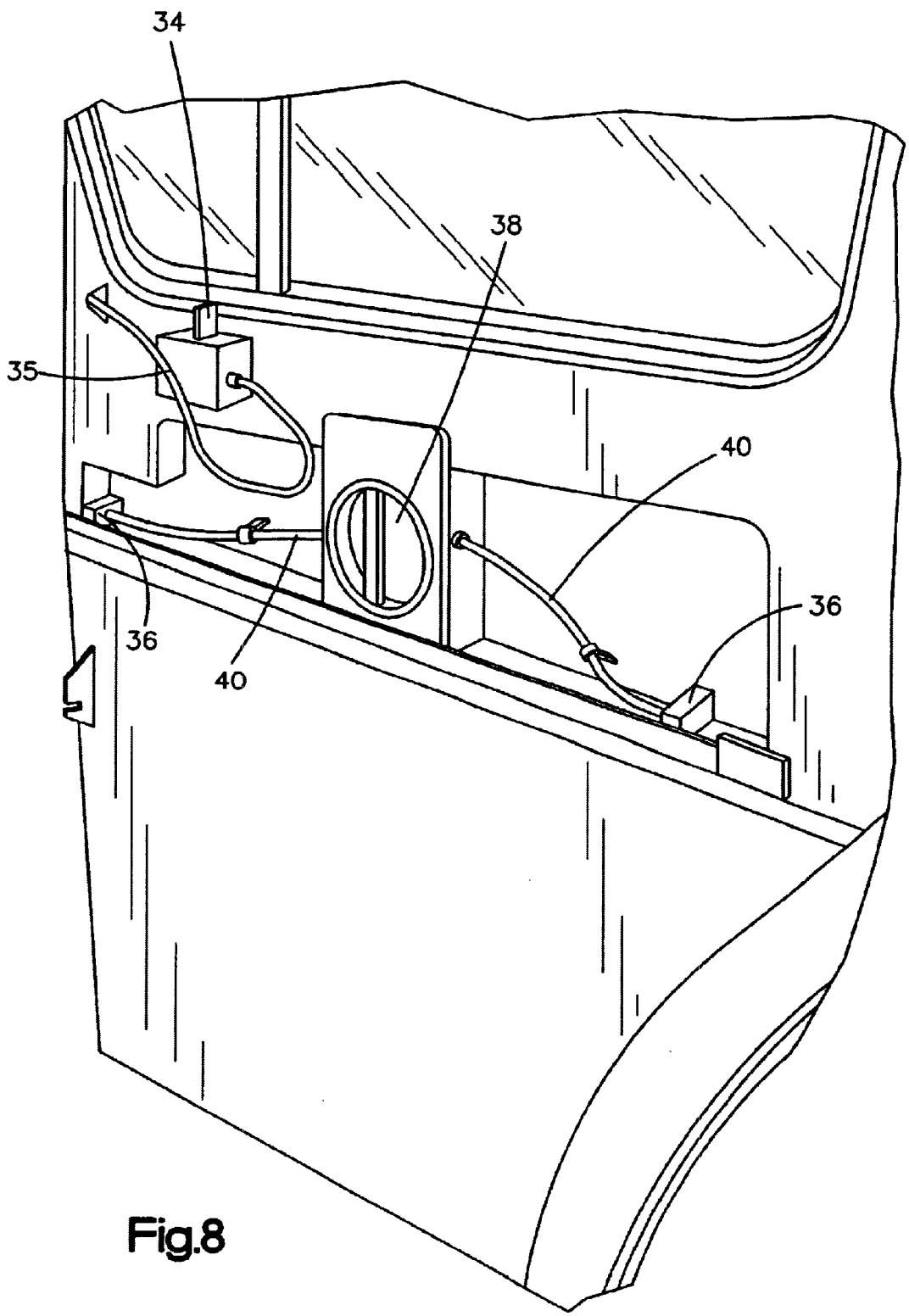

Referring to FIG. 8, an interior release lever for the latch 26 is shown at 34. The lever 34 is connected to the latch 26 by a cable 35.

Figure 2:
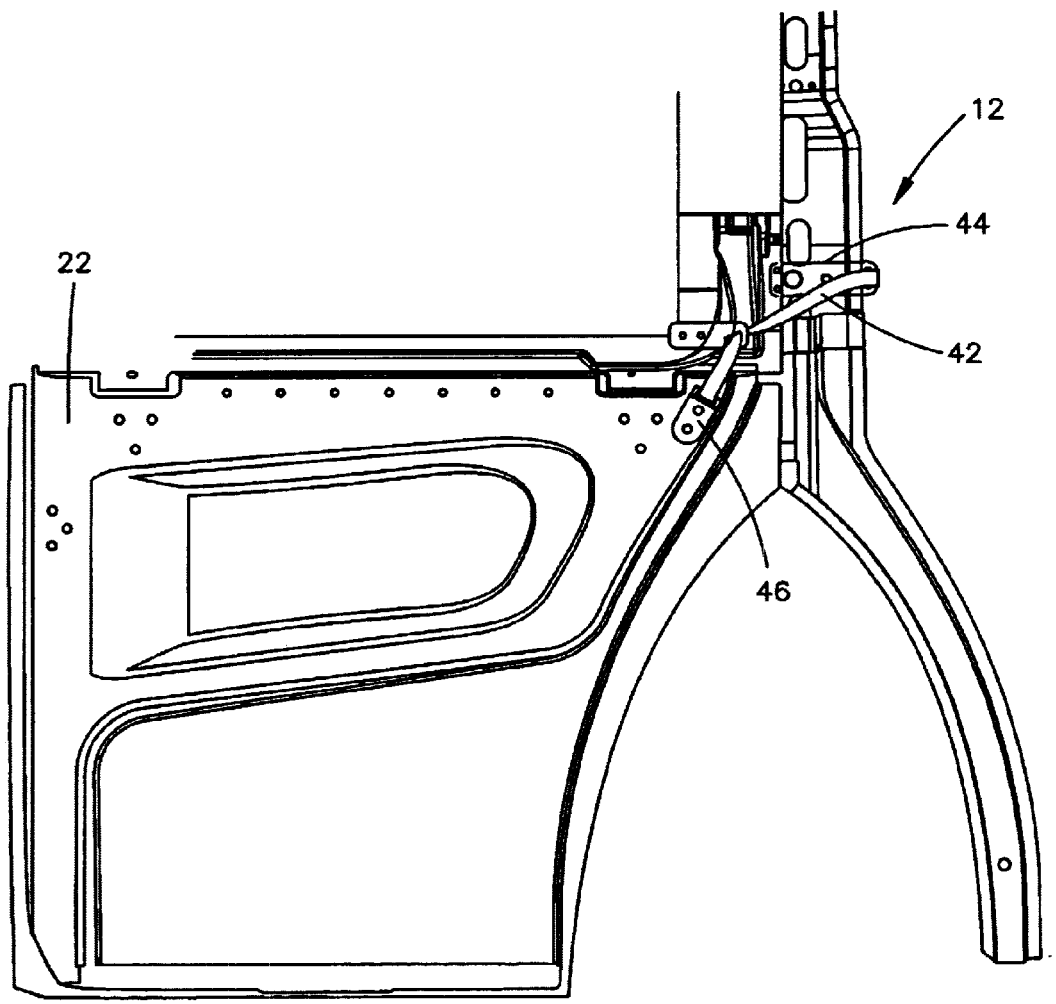
FIG. 2 is a fragmentary view showing the door sections vertically aligned and in their partially open condition.
Figure 3:
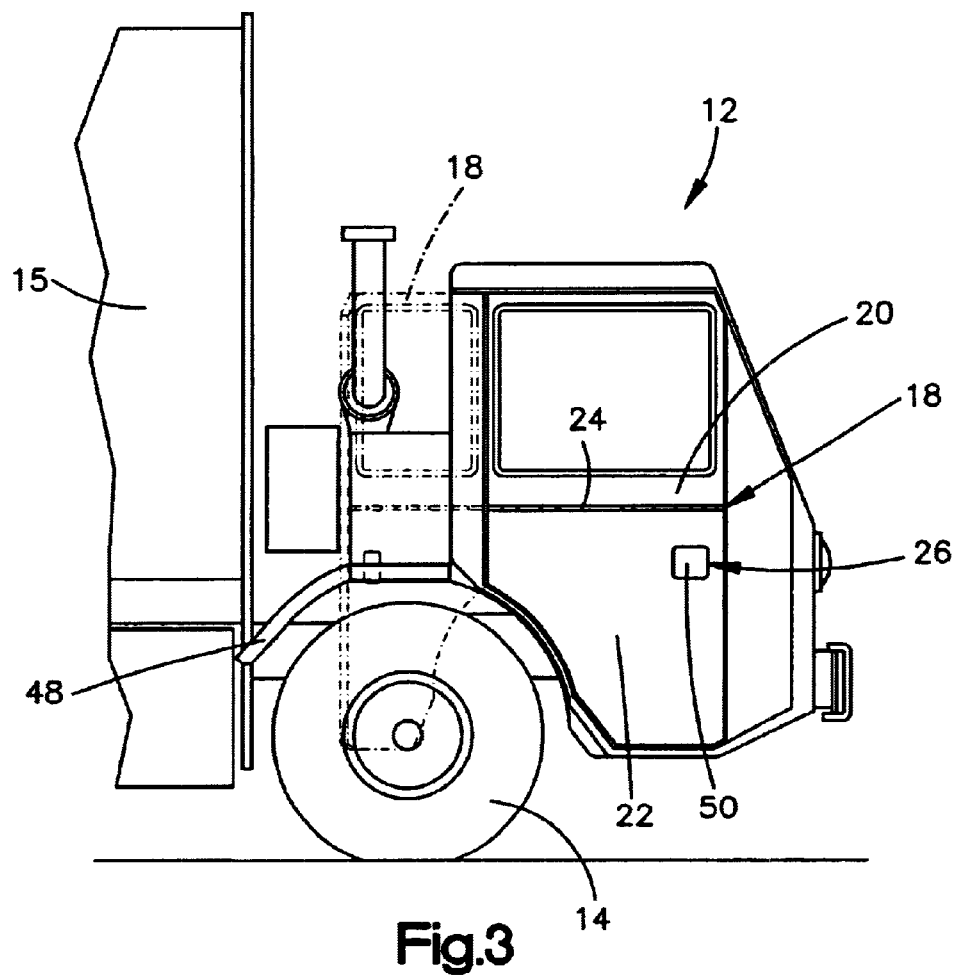
FIG. 3 is an elevational view of the cab of the vehicle showing the door sections aligned and in a partially open position in phantom.

Spaced latching mechanisms 36 are provided to maintain the door sections in their vertically aligned position of FIGS. 1 and 2. The spaced latching mechanisms function to secure the door sections in their vertically aligned position. A release handle 38 is connected to the latching mechanisms 36 by cables 40.

Figure 4:
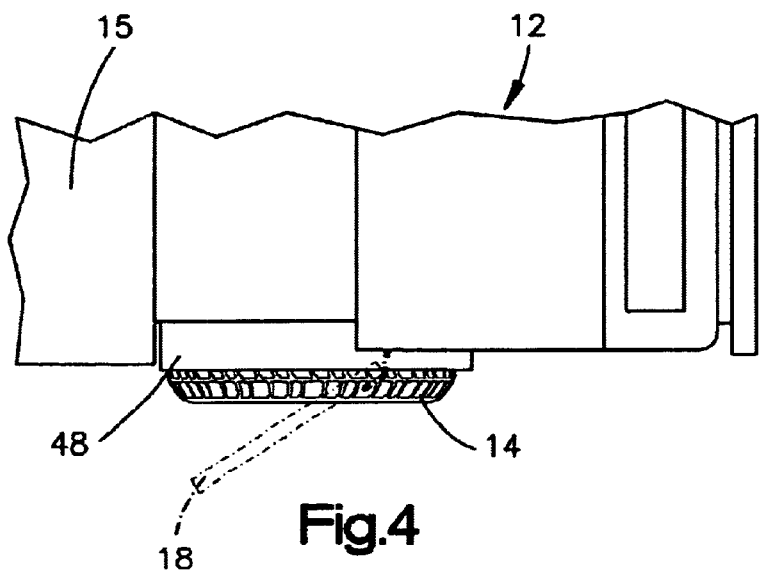
FIG. 4 is a fragmentary plan view of the vehicle of FIG. 3.

A tether 42 is provided, FIG. 2. The tether extends between a door jamb anchor 44 and a lower section anchor 46. When the door sections are in the vertically aligned relationship of FIGS. 1–4 the tether limits the door 18 to movement between the closed position of FIG. 1 and the partially open position of FIGS. 3 and 4. As is best seen in FIG. 2, this is because the tether slopes downwardly between the anchors 44, 46 having, the effect of horizontally foreshortening the tether. Thus collision between the door and a vehicle fender 48 on the front road wheel 14 is avoided.

Figure 5:
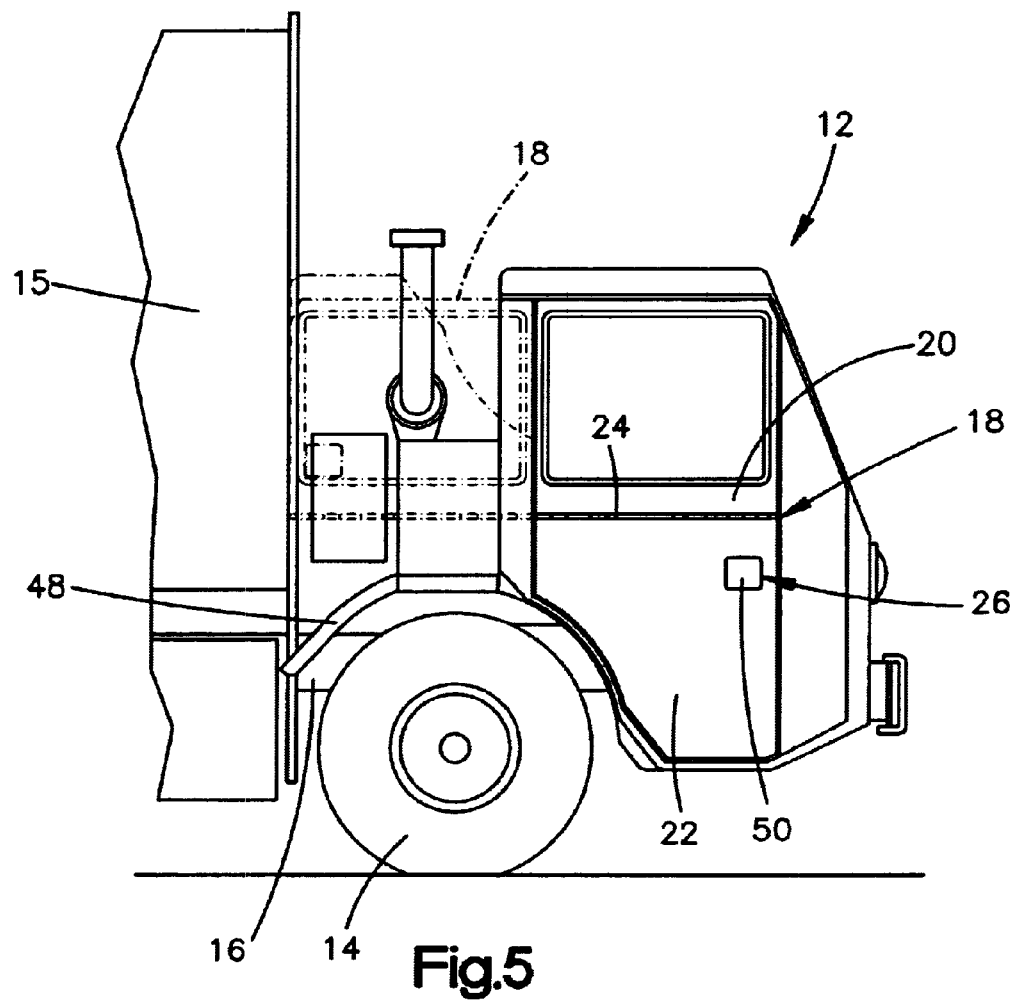
FIG. 5 is a view corresponding to FIG. 3 showing the door sections in their juxtaposed and full open condition.
Figure 6:
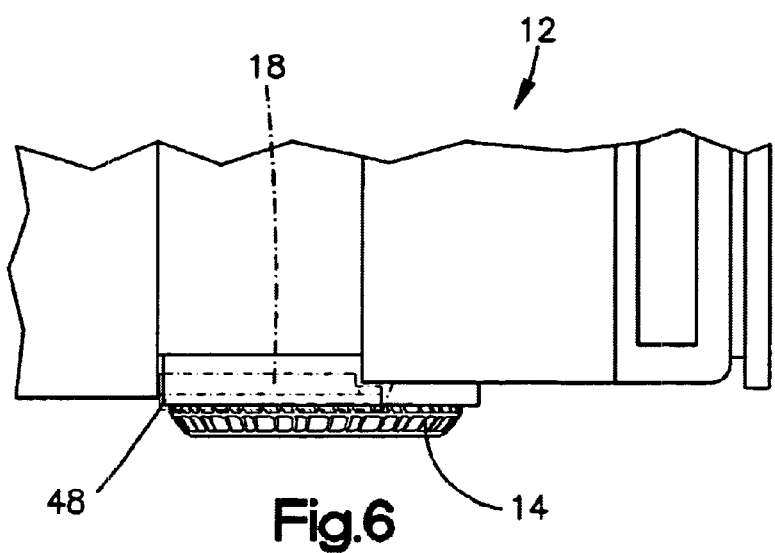
FIG. 6 is a fragmentary plan view of the vehicle of FIG. 5.

When the door sections are in their juxtaposed relationship of FIGS. 5 and 6, the tether permits movement of the door to the position of FIGS. 5, 6 and 7 in a latched condition over the vehicle fender 34 and a front one of the road wheels 14. The further rotational opening arc to the full open condition is achieved because the tether is essentially horizontal and effectively longer than when the door sections are in their vertically aligned relationship.

When the door sections are in the juxtaposed relationship of FIGS. 5 and 6, the tether permits movement of the door to the position of FIGS. 5, 6 and 7 in a latched condition over the vehicle fender 48 and a front one of the road wheels 14. The further rotational arc to the full open condition is achieved because the tether is essentially horizontal and effectively longer than when the door sections are in their vertically aligned relationship.

Operation

In operation the door latch 26 is unlatched either by actuating the interior release lever 34 or an exterior handle 50. The door may then be swung to its partially open position of FIGS. 2–4. If it is desired to move the door to its full open position of FIGS. 5–7 then latch release handle 38 is operated to allow the lower section 22 to be rotated about the hinge 24 into juxtaposed relationships with the upper section 20. Once in the juxtaposed relationship the tether anchors 44, 46 have been moved to a position generally symmetrical about a common horizontal plane so that the tether is in effect lengthened. At that juncture the door latch 26 is engaged with the second female latch section 28. The door is then able to swing to the full open position and be maintained in that position by the open door latch 30.

Should the second female latch section 28 become disconnected from the latch 26 while the open door latch 30 engages the upper section 20, the lower section 22 will move only slightly from its juxtaposed relationship. The upper section movement is limited because the tether is essentially stretched to its full length when the door is in its full open position.

To return the door to a partially closed or closed position with the door sections 20, 22 vertically aligned, one pulls the pull ring cable 32, FIG. 7 to release the open door latch 30 and allow the door to be swung toward its closed position.

The tether has sufficient length to allow the lower section 22 to rotate about the axis of the hinges 24 to the vertically aligned condition.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. In an over the highway vehicle having a body defining an occupant space and an access opening to the space, an improved door construction comprising:
   a) a door pivotally connected to the body and having pivotally connected upper and lower positions;
   b) the door being pivotal relative to the body between a closed position and a full open position allowing unobstructed passage into and out of the space;
   c) the lower portion being pivotal relative to the upper portion between an aligned condition for closing the opening and an articulated condition wherein the portions are generally juxtaposed;
   d) the portions being in a generally vertically aligned relationship when in the aligned condition and in a generally side by side relationship, when in the articulated condition;
   e) a tether interposed between the body and the lower portion; and, the tether limiting pivotal movement of the door when the lower portion is in the aligned condition to a partially open position and permitting movement of the door to the full open position when the lower portion is in the articulated condition.

2. The construction of claim 1 wherein the tether permits movement of the door to the full open position only when the door is in the articulated condition.

3. The construction of claim 1 wherein when the door is in the full open position the tether limits pivotal movement of the lower portion downwardly on premature release of a latch maintaining the articulated condition thereby maintaining the door portions in a partially articulated condition.

4. The construction of claim 1 wherein inner surfaces of the door portions are adjacent one another when in the articulated condition.

5. An over the highway service vehicle comprising:
   a) a cab defining a compartment for an operator and at least one passenger, the compartment having an access opening;
   b) a door having upper and lower sections and a hinge interconnecting the sections;
   c) the door being pivotally connected to the cab for selectively closing the opening;
   d) the door being pivotal relative to the cab to closed, partially open and full open positions;
   e) the door sections being shiftable between aligned and substantially juxtaposed conditions;
   f) a tether connected to the cab and the lower section and sized to limit door shifting between the closed and partially open positions when the sections are in the aligned condition; and
   g) the tether being sized and positioned to permit the door to be shifted to the full open position when the sections are in the substantially juxtaposed condition.

6. The vehicle of claim 5 further including at least one latch for maintaining the door in the substantially juxtaposed condition and the full open position.

7. The vehicle of claim 6 wherein there is one double acting latch for maintaining the juxtaposed position and another latch for maintaining the full open position.

8. The construction of claim 5 wherein the door is in the full open position the tether limits pivotal movement of the lower portion downwardly on premature release of latching thereby maintaining the door sections in a partially articulated condition.

9. The construction of claim 5 wherein inner surfaces of the door portions are adjacent one another whine in the articulated condition.

10. A door for a service vehicle, the door comprising:
    a) an upper section including a window opening;
    b) a lower section pivotally connected to the upper section and moveable between a section aligned condition for door closure and a section juxtaposed condition for use when the door is in a full open position;
    c) latching for securing the sections together when the sections are in the juxtaposed condition and securing the door to the vehicle when the section are in the juxtaposed condition;
    d) a tether connected to the lower section and connectable to the vehicle for limiting door opening to partial opening when the sections are in the aligned condition and permitting full open when the sections are in the juxtaposed condition.

11. The door of claim 10 wherein the tether is also for limiting relative pivoting of the sections when the sections are in the juxtaposed condition, one of the sections is latched to the vehicle and the latching between the sections is released.

12. A process of controlling the extent of opening of an articulated access door to an occupant space in a cab of a service vehicle comprising:
    a) opening the door while limiting the opening of the door when upper and lower sections of the door are vertically aligned by extending a tether between one anchor secured to the lower section and another anchor secured to the cab at an elevation above an axis of section articulation;
    b) pivoting the lower section about the axis to juxtapose the sections and bring the one anchor above the axis thereby extending the effective horizontal length of the tether; and,
    c) while the sections are juxtaposed moving the door to a full open position.

13. The process of claim 12 further including the step of latching the door in the full open position.

* * * * *